April 1, 1924.  1,489,138
J. W. LECLERC ET AL
SAFETY RELIEF VALVE FOR LOCOMOTIVES AND THE LIKE
Filed Nov. 28, 1921    2 Sheets-Sheet 1
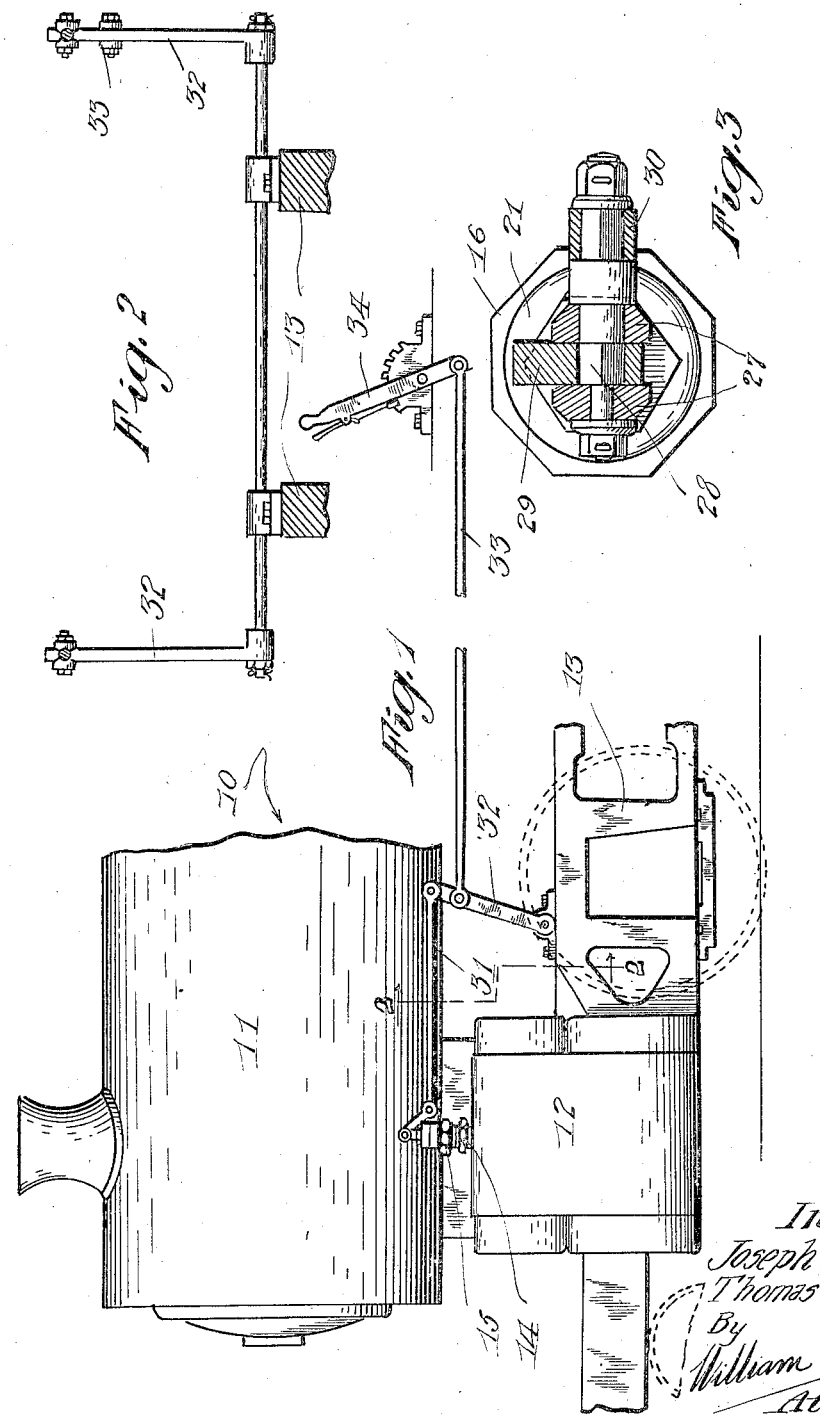
Inventors
Joseph W. Leclerc
Thomas R. Marsden
By William Cointon
Attorney

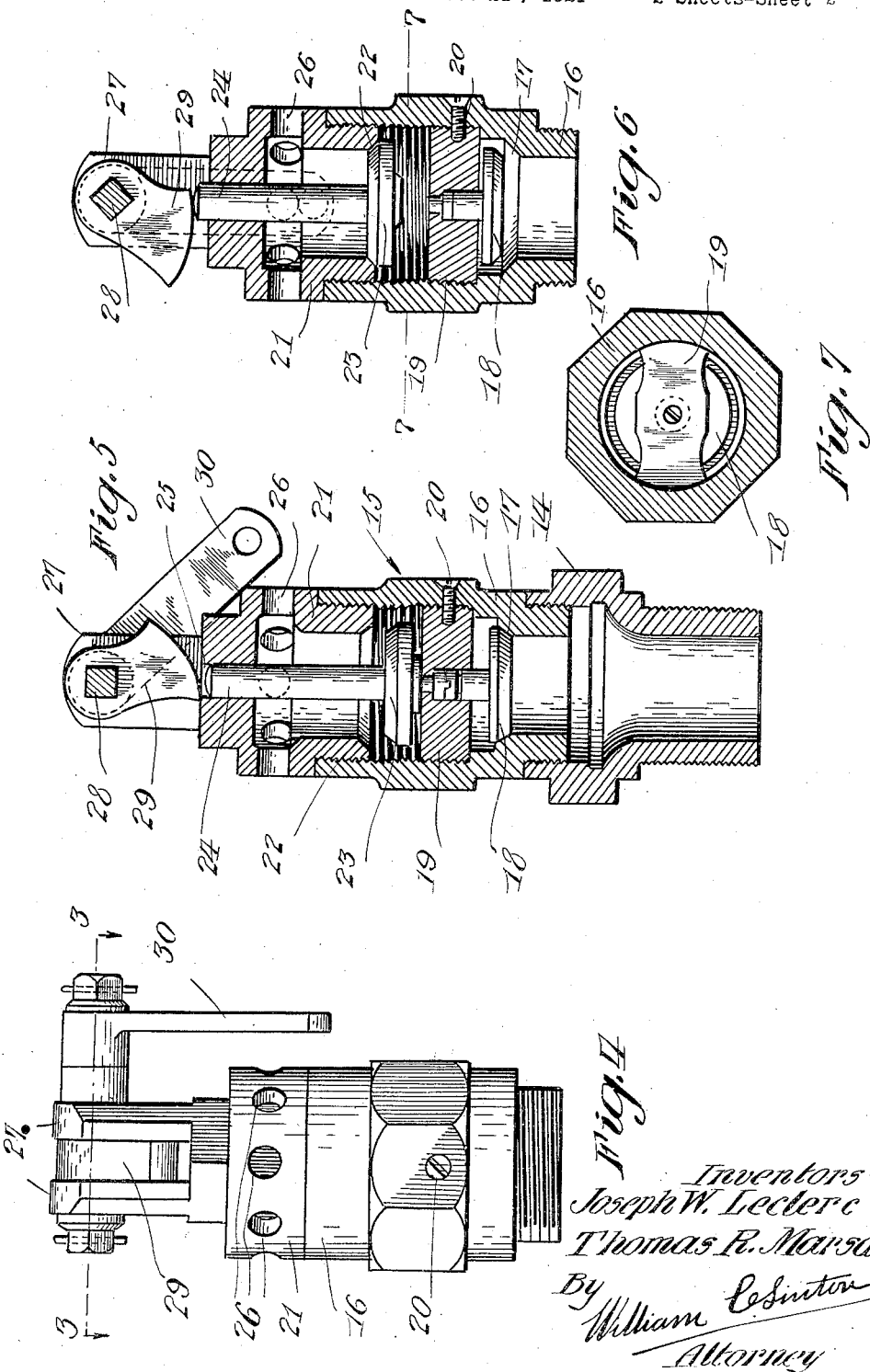

Patented Apr. 1, 1924.

1,489,138

UNITED STATES PATENT OFFICE.

JOSEPH WILFRID LECLERC, OF CARTIERVILLE, AND THOMAS R. MARSDEN, OF MONTREAL, QUEBEC, CANADA.

SAFETY RELIEF VALVE FOR LOCOMOTIVES AND THE LIKE.

Application filed November 28, 1921. Serial No. 518,392.

*To all whom it may concern:*

Be it known that we, JOSEPH W. LECLERC and THOMAS R. MARSDEN, subjects of the King of Great Britain, residing at Cartierville, Province of Quebec, Canada, and Montreal, Province of Quebec, Canada, respectively, have invented certain new and useful Improvements in Safety Relief Valves for Locomotives and the like; and we do hereby declare that the following is a full, clear, and exact description of the invention, such as will enable others skilled in the art to which it appertains to make and use the same.

The present invention relates to new and useful improvements in safety relief valves for locomotives and the like.

The primary object of the invention is the provision of a safety valve, which will prevent accumulation of steam in the steam chest due to a leaking throttle valve, or for various other reasons, and preventing any undesired starting of the locomotive when not desired.

Another object of the invention is the provision of a valve such as above referred to, which can be positively operated by the engineer in case of the throttle valve becoming out of order for any reason and which will immediately cause the discharge of steam from the steam chest, and stop the locomotive.

The principal advantage of the invention lies in the fact that the device comprises a housing having a gravity or check valve in addition to the main valve, so that when the main valve is opened to place the steam chest in communication with the atmosphere, the gravity valve may seat to prevent entrance of dirt and cold air from the atmosphere into the steam chest.

A still further object of the invention is the provision of a valve such as above referred to which will be comparatively simple and inexpensive to manufacture, reliable and efficient in use, and readily operated.

With the above and other objects in view, the present invention resides in the novel features of construction, formation, combination, and arrangement of parts to be hereinafter more fully described, claimed, and illustrated in the accompanying drawings, forming a part of the present application, and in which:

Figure 1 is a side view of a fragment of a locomotive showing the application of the valve thereto, and means for operating the same;

Figure 2 is a transverse sectional view, taken on the line 2—2 of Figure 1;

Figure 3 is a horizontal sectional view taken on the line 3—3 of Figure 4;

Figure 4 is a side elevation of the valve removed;

Figure 5 is a vertical sectional view thereof, showing the same with the cam in such position as to prevent the seating of the valve;

Figure 6 is a similar view showing the valve seated and the cam in inoperative position; and, Figure 7 is a horizontal sectional view taken on the line 7—7 of Figure 6.

Referring now to the accompanying drawings by corresponding characters of reference throughout the several views, the numeral 10 designates in general a fragment of a locomotive including the boiler 11, the usual steam chest 12, and a portion of the front truck 13.

The usual discharge pipe for the steam chest is shown at 14 and in the upper end of this pipe 14 is threaded my improved valve, designated in general by the numeral 15.

The valve 15 includes a casing 16 provided with a valve seat 17, adjacent its lower end, in which the check valve 18 is mounted, the latter being carried in a cage 19, which is screw threaded within the casing 16 and held in position by the set screw 20.

A sleeve 21 is threaded at the upper end of the casing 16 and is provided at its lower end with a valve seat 22 for engagement with the valve shown at 23.

The valve 23 includes an upwardly extending stem 24, which passes through an opening 25 formed in the upper end of the sleeve 21, while the said sleeve 21 is provided with a plurality of openings shown at 26.

A pair of spaced ears 27 are provided upon the upper end of the sleeve 21, and in these ears 27 is mounted a shaft 28, which has keyed thereto a cam 29 adapted, when in one position, to permit the raising of the stem 24, and seating of the valve 23, and while in an opposite position, to force the said valve downwardly by its engagement with the stem 24, thus unseating the valve, as desired.

The shaft 28 is provided with an operating arm 30 which is connected by a rod 31 to a rocker arm construction 32 which is actuated through the instrumentality of a rod 33, by the operating lever 34 which may be positioned in the cab of the locomotive, or at any other desired location.

When the locomotive is in operation, the cam is normally in the position shown in Figure 6, which permits the pressure of the steam to seat the valve 23 and prevents the escape of steam from the steam chest through the openings 26. In this position it is immaterial whether the valve moves, but it is free to drop on its seat when the steam pressure is relieved, thus preventing the entrance of cold air and dirt into the chamber.

When, however, the locomotive comes to a stop, and it is desired to discharge the steam from the steam chest either temporarily or for the purposes of repairing or otherwise, the lever 34 is actuated and through the cam, forces the stem 24 downwardly, unseating the valve 23, and permitting the steam pressure in the steam chest to raise the valve 18 allowing said steam which is accumulated therein to escape upwardly past the valves 18 and 23 and out through the openings 26. When the steam is exhausted, the check valve 18 seats by gravity, thus preventing the entrance of cold air or dirt into the steam chamber or cylinder.

From the foregoing description, taken in connection with the accompanying drawings, it will be manifest that a valve for locomotives or the like, for the purposes above specified, is provided, which will fulfil all of the necessary requirements of such a device, and it should be understood that various minor changes in the specific details of construction can be resorted to within the scope of the appended claim, without departing from the spirit or sacrificing any of the advantages of the invention.

Having thus fully described the invention, what we claim as new and desire to secure by Letters Patent is:—

A relief valve adapted to be applied to a pressure chamber, comprising a casing having an inlet and an outlet, a valve seat formed in said casing, a valve head adapted for cooperation with said seat, a check valve disposed between the inlet and the first valve and adapted to open at pressure through the inlet, and positive means for holding the valve head spaced from its seat.

In witness whereof we have hereunto set our hands.

JOSEPH WILFRID LECLERC.
THOMAS R. MARSDEN.